United States Patent [19]
Okada

[11] 4,141,126
[45] Feb. 27, 1979

[54] METHOD OF MAKING A ROTARY ENGINE ROTOR AND BEARING STRUCTURE

[76] Inventor: Fukumatsu Okada, 4-151, Umemori-zaka, Ueda, Tenpaku, Meito-ku, Nagoya-shi, Japan

[21] Appl. No.: 821,816

[22] Filed: Aug. 4, 1977

Related U.S. Application Data

[63] Continuation of Ser. No. 673,367, Apr. 5, 1976, abandoned.

[30] Foreign Application Priority Data

May 28, 1975 [JP] Japan ................................. 50-63855

[51] Int. Cl.² .......................... B23P 15/00; F01C 1/02
[52] U.S. Cl. .............................. 29/156.4 R; 418/61 A
[58] Field of Search ................. 29/156.4 R; 418/61 A, 418/150; 123/8.01, 8.45

[56] References Cited

U.S. PATENT DOCUMENTS

| 3,270,720 | 9/1966 | Ehrhardt | 418/61 A |
| 3,884,600 | 5/1975 | Gray | 418/61 A |

Primary Examiner—C. W. Lanham
Assistant Examiner—Daniel C. Crane
Attorney, Agent, or Firm—Paul L. Sjoquist

[57] ABSTRACT

A method of making a rotary engine internal fixed bearing surface and rotor for rotating about the fixed bearing surface, where the rotary engine combustion chamber is shaped in the form of a two arch epitrochoidal line and the rotor has three apexes. The fixed bearing surface is constructed with an elliptical cross section and the rotor has an internal bearing surface in the form of a regular triangle, wherein the method of constructing the fixed bearing surface is derived from the rotor regular triangle bearing surface, so as to permit no loading between the rotor apexes and the engine combustion chamber walls.

5 Claims, 16 Drawing Figures

METHOD OF MAKING A ROTARY ENGINE ROTOR AND BEARING STRUCTURE

This application is a continuation of Patent Application Ser. No. 673,367 filed Apr. 5, 1976, now abandoned.

BACKGROUND OF THE INVENTION

This invention relates to a method of making a rotary engine internal fixed bearing surface and rotor for rotating about the fixed bearing surface.

A rotary engine obtains a number of clearances around bearings and gears required to effect eccentric rotation of its rotor. The increase in such clearances during the repeated operation of the engine prevents smooth eccentric rotation of the rotor, resulting in the apperance of disorder in the trochoidal curve followed by the rotor apexes. This disorder leads to development of wear and damage between the internal surface of the casing and the rotor apexes and leakage of gases through the gaps between the casing internal surface and the rotor apexes. It is, thus, imperative to construct such an engine with an increased gap between the casing internal surface and the rotor apexes to make up for the width of such disorder in the trochiodal curve. No sealing material so far used is satisfactory for the purpose of closing such an enlarged gap against gas leakage, but the rotary engines known in the art operate with a poor combustion efficiency.

This invention has been made with a view to eliminating the aforementioned drawbacks of the rotary engines known in the art. According to this invention, there is provided a method of constructing a rotary engine in which only a single bearing is involved to effect eccentric rotation of its rotor of which the apexes follow a trochiodally curved path during the rotor roation, and in which the single bearing is ensured against any disorder in the bearing support for the rotor while the latter is rotating. This invention provides a method of constructing a rotary engine, and more particularly, a novel and improved method of formulating the elliptical cross-sectional configuration of a supporting shaft secured to sideboards and the regular triangular configuration of a rotor bearing which cooperate to permit smooth eccentric rotation of the rotor without causing any leakage developing disorder. The method of this invention ensures construction of such an elliptical configuration which represents a geometrically reasonable and perfect shape permitting the elliptical supporting shaft to be maintained in sliding contact with the internal surface of the triangular bearing without leaving or being caught in such internal bearing surface at any moment throughout the rotation of the shaft relative to the bearing surface. There is, thus, practically no clearance between those elliptical and triangular surfaces. Therefore, no undesirable disorder can develop in the cooperative rotation of the elliptical shaft and the triangular bearing, however long such rotation may continue.

In the most typical rotary engine known in the art as the NSU-Wankel engine, the rotor within the casing achieves eccentric revolution around an eccentric shaft and during such revolution, it also rotates about its own axis of rotation by virtue of the cooperation between an externally toothed stationary gear and an internally toothed movable gear. Undesirable clearances or excessive play appears between the eccentric shaft and main and rotor bearings, while backlash and incorrect tooth engagement appear between the stationary and movable gears. These clearances, play and incorrect engagement may develop to prevent smooth eccentric rotation of thr rotor, resulting in disorder in the trochiodal curve following by the rotor apexes.

U.S. Pat. No. 3,884,600 to Gray describes a rotary engine in which the eccentric rotation of a rotor is accomplished by the cooperation of an elliptical guide member in the center of an end plate and a regular triangular bearing surface on one side of the rotor. In Gray's engine, however, the bearing surface on the rotor rotates about the guide member on the end plate. During a full rotation of the bearing surface, the elliptical guide member is contacted by all the three sides of the triangular bearing surface, or separated from at least one of the sides of the triangular bearing surface, so that excessive clearances or play develop between the rotor and the bearing surface. Gray himself points out this problem in the specification of his United States patent. Gray clearly reveals the aforementioned disadvantages in FIG. 3 accompanying his patent. In his specification, Gray fails to discover a geometrically reasonable and perfect elliptical configuration which permits the guide member to be maintained in smooth sliding contact with the triangular bearing surface for rotation relative thereto without separating from or being hindered by the bearing surface. In Gray's rotary engine, the rotor fails to achieve smooth eccentric rotation within the casing, with a resultant disorder in the trochoidal curve followed by the rotor apexes.

In both Wankel and Gray engines, as discussed above, disorder appears in the trochoidal curve followed by the rotor apexes and gives rise to undesirable wear and damage between the casing internal surface and the rotor apexes, as well as leakage on the gas-tight chamber. Therefore, it has heretofore been essential to construct an engine with an enlarged clearance between the casing internal surface and the rotor apexes to compensate the width of such disorder in the trochoidal curve. Such a clearance is, however, too large to be effectively closed against leakage; and the engine has only a poor combustion efficiency.

SUMMARY OF THE INVENTION

It is an object of this invention to provide a method of constructing a rotary engine having none of the drawbacks inherent in the rotary engines known in the art. This invention aims at elimination of any possible disorder that may develop in the trochoidal curve followed by the rotor apexes in a rotary engine in which the eccentric rotation of the rotor is effected by the cooperation between the elliptical supporting shaft extending from the center of the sideboards and the regular triangular bearing surface provided in the center of one side of the rotor. This invention, thus, provides a method of constructing the supporting shaft with a geometrically reasonably and perfectly shaped elliptical cross-sectional configuration which prevents occurrence of any disorder in the eccentric rotation of the rotor, and a corresponding appropriate regular triangular configuration of the rotor bearing surface.

It is another object of this invention to provide a method of constructing the elliptical configuration of a rotor supporting shaft which can produce a desired compression ration in a rotary engine structure in which the elliptical supporting shaft on the sideboard cooperates with the regular triangular bearing surface on the rotor.

It is a further object of this invention to provide a method of constructing a rotary engine having a supporting shaft of the elliptical cross-sectional configuration extending from the center of the sideboard, the supporting shaft having a longitudinal axis located at an angle in a selected direction relative to the transverse axis of the sideboard; and a bearing surface provided in that portion on one side of the rotor which corresponds to the supporting shaft, so that the energy produced by combustion of fuel in the engine may be converted into a rotational torque with an increased efficiency.

These and other objects, novel features and advantages of this invention will become apparent from the following detailed description and the accompanying drawings.

BRIEF DESCRIPTION OF THE DRAWINGS

FIGS. 10 through 12 show a preferred embodiment of this invention, wherein FIGS. 13 through 16 show another embodiment of this invention, wherein

In FIGS. 12, 14 and 16, those portions of the structure which are not considered essential for the description of this invention, for example, the output bearing or the spline boss on the rotor, are omitted to provide a clear and precise understanding of the invention. de

DETAILED DESCRIPTION OF THE PREFERRED EMBODIMENTS

Description will first be made of the principle of function of the rotor and sideboard of a rotary engine constructed according to this invention.

Figure 1:
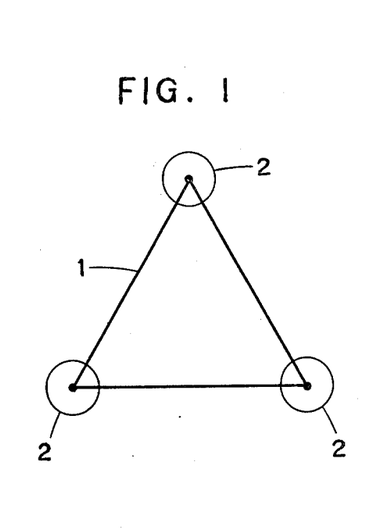
FIGS. 1 through 9 illustrate the principle of function of the rotor and sideboards constructed according to this invention.

Three circles 2 having a selected equal radius are drawn so that each of the circles 2 has its center on one of the apexes of a regular triangle 1 of a selected size, as shown in FIG. 1.

Figure 2:
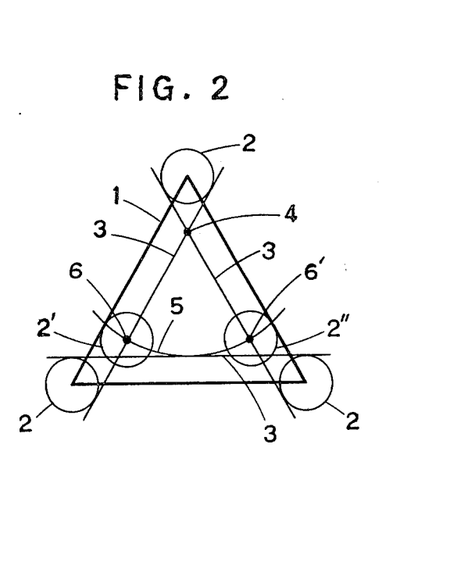

Referring to FIG. 2, three lines 3 which are tangential relative to circles 2 are drawn within the triangle 1, so that each line 3 is parallel to one of the three sides of the triangle 1. An arc 5 having a center on an intersection 4 between two lines 3 is drawn so that it partially lies on the third line 3 as shown in FIG. 2. A pair of circles 2' and 2" each having a radius equal to that of the circles 2 are drawn to have their centers, respectively, on the intersections 6 and 6' between the lines 3 and the arc 5.

Figure 3:
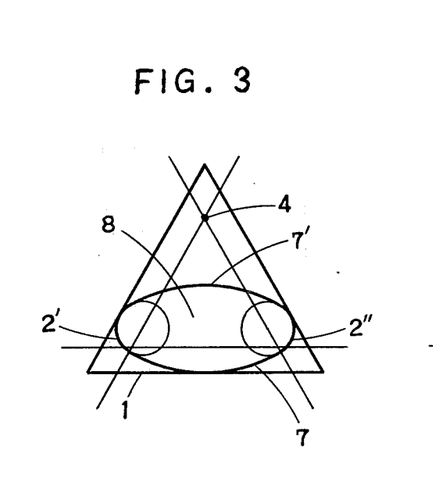

As shown in FIG. 3, the circles 2' and 2" are connected to each other by an arc 7 having a center on the intersection 4. The arc 7 partially contacts the bottom side of the triangle 1. Another arc 7' having a radius equal to that of the arc 7 is drawn symmetrically to define an ellipse 8 with the arc 7 and the circles 2' and 2" as shown in FIG. 3.

Figure 4:
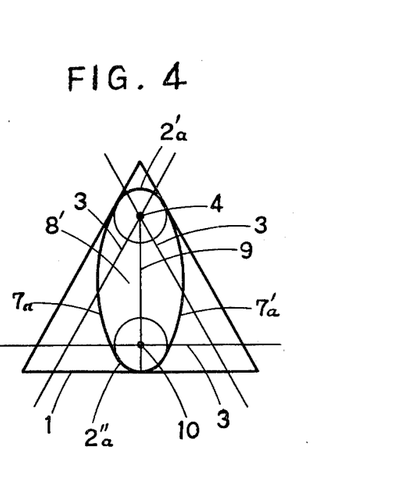

Then, a perpendicular 9 is drawn between the intersection 4 and the bottom side of the triangle 1 as shown in FIG. 4. A pair of circles 2'a and 2"a each having a radius equal to that of the circles 2 (FIG. 1) are drawn, so that the circle 2'a has a center on the intersection 4, while the circle 2"a has its center on an intersection 10 between the line 3 and the perpendicular 9. The circles 2'a and 2"a are connected to each other by a pair of arcs 7a and 7'a each having a radius equal to that of the arcs 7 and 7' of FIG. 3, whereby an ellipse 8' is defined by the circles 2'a and 2"a and the arcs 7a and 7'a as shown in FIG. 4. The ellipse 8' of FIG. 4 is congruent with the ellipse 8 of FIG. 3.

Figure 5:
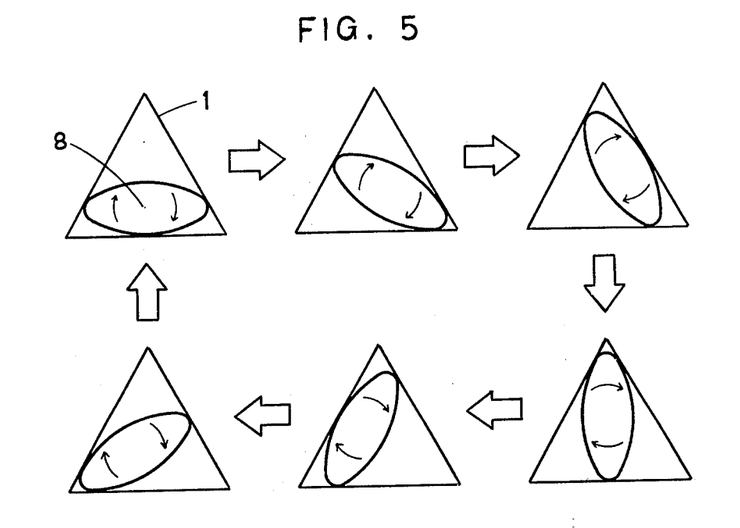

Both of the ellipses 8 and 8' confined within the regular triangle 1 have a geometrically accurate and perfect shape which permit the ellipses 8 and 8' to be smoothly rotatable in close contact with all of the three sides of the triangle 1 without being caught in any corner of the triangle or separating from even one side thereof, as illustrated in FIG. 5.

Figure 6:
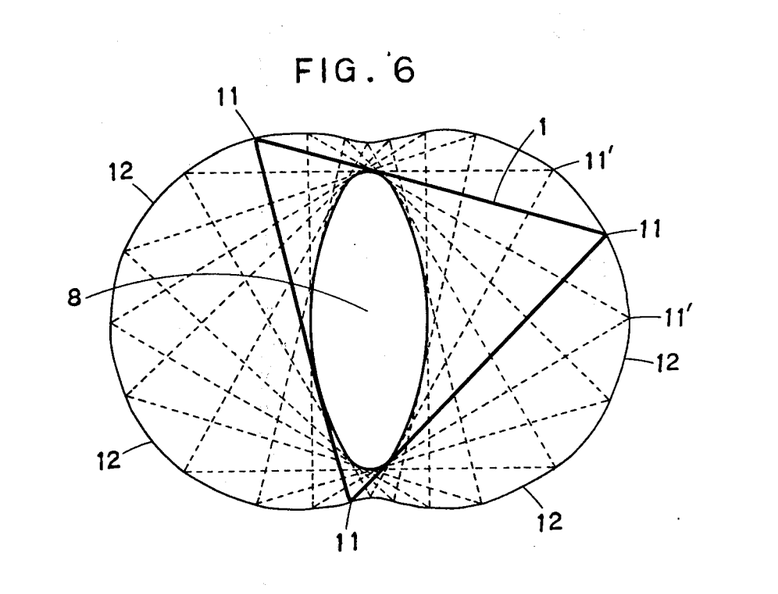
Figure 7:
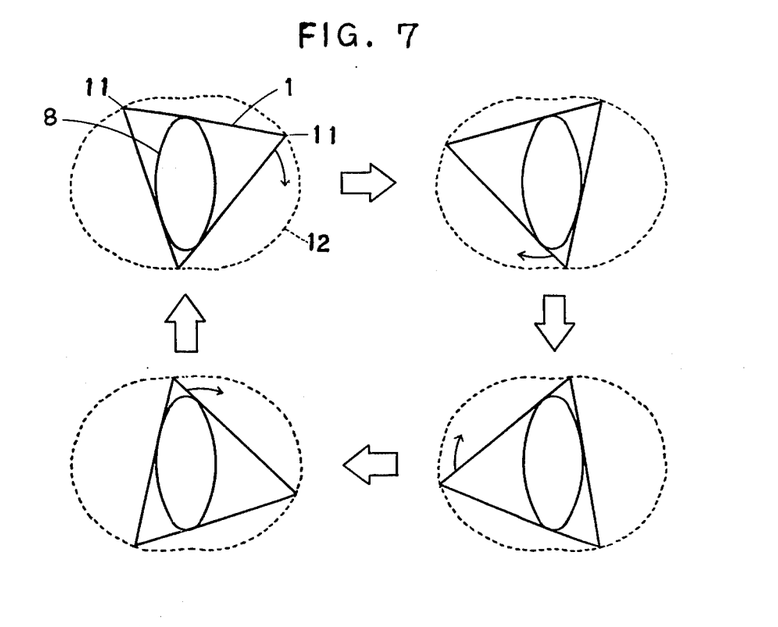

Referring to FIG. 6, when the ellipse 8 is considered stationary, the regular triangle 1 rotates about the ellipse 8 and the three apexes 11 of the triangle 1 are shifted to the apexes 11' of a practically infinite number of regular triangles shown by broken lines to draw a trochoidal orbit 12. Therefore, when the regular triangle 1 circumscribing the ellipse 8 is rotated about the ellipse 8, each apex 11 of the triangle 1 moves round along the trochoidal orbit 12 without deviating therefrom at any point, as illustrated in FIG. 7.

The foregoing principle should now be considered in conjunction with the following additional concept of this invention.

The center of eccentric rotation of the rotor may be varied as desired by changing the radius of the circles 2 shown in FIG. 1.

Figure 8:
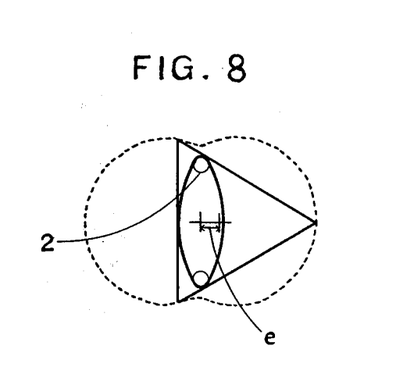
Figure 9:
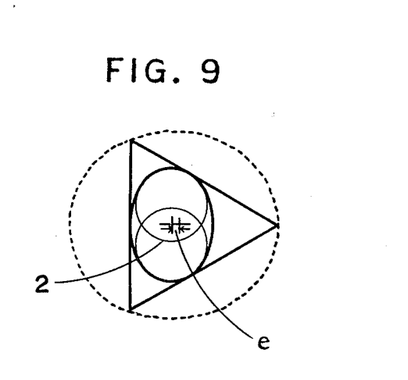

Referring to FIG. 8, the circles 2 now have a reduced radius and the eccentricity e is enlarged, while in FIG. 9, the circles 2 have a larger radius and the eccentricity e is reduced. When the eccentricity e is enlarged, the volumetric ratio (compression ratio) of the gastight chamber becomes larger, while the volumetric ratio of the chamber becomes smaller when the eccentricity e is reduced. Accordingly, the volumetric ratio of the gastight chamber may be chosen as desired if the radius of the circles 2 is appropriately determined.

The invention will now be described in further detail with reference to the preferred embodiments thereof. Both of the embodiments are constructed in accordance with the aforementioned principles of the invention.

Figure 10:
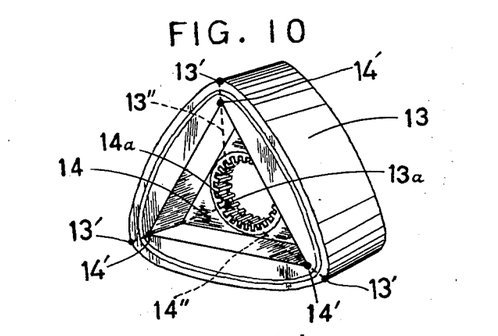
FIG. 10 is a perspective view of the rotor.
Figure 11:
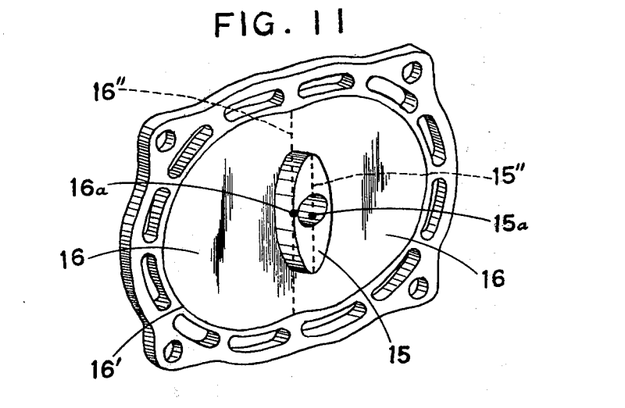
FIG. 11 is a perspective view of the sideboard on the combustion chamber side thereof and FIG. 12 is a side elevation of the rotor and the sideboard as assembled.
Figure 12:
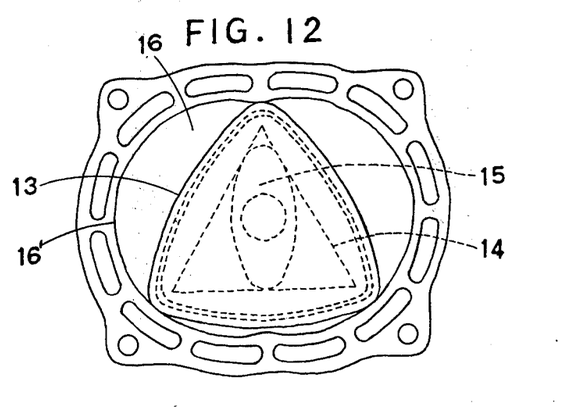

Attention is first directed to the first embodiment shown in FIGS. 10 through 12.

Referring to FIG. 10, there is shown a rotor 13 formed on one side thereof with a bearing surface or concavity 14 having a selected depth and a regular triangular cross-sectional configuration. The bearing 14 is positioned in the center of the side of the rotor 13. The regular triangle defining the bearing 14 has a center 14a coinciding with the center 13a of the side of the rotor 13.

Three broken lines 13" are drawn to connect the three apexes 13' of the rotor 13 to its center 13a. Three other broken lines 14" are drawn to connect the three apexes 14' of the bearing 14 to its center 14a. The latter broken lines 14" overlie the former broken lines 13" as is apparent from FIG. 10.

An ellipse which is confined within the regular triangle of the bearing 14 and smoothly rotatable in close contact with all of the three sides of that triangle is formed in accordance with the principles illustrated in FIGS. 1 through 4. This ellipse is used to construct a supporting shaft 15 of a predetermined length and an elliptical cross-section projecting from one side of a sideboard 16 as shown in FIG. 11. The supporting shaft 15 is positioned in the center of the sideboard 16.

The line of apsides 15" (shown in a broken line in FIG. 11) of the ellipse which represents the cross-section of the supporting shaft or fixed bearing 15 is superposed on the minor line 16" (shown in a broken line in FIG. 11) of a trochoidal orbit 16' encircling the sideboard 16 as viewed in a plane perpendicular to the sideboard 16. The middle point 16a of the line 16" is likewise superposed on the middle point 15a of the line 15". When the rotor 13 and the sideboard 16 are assembled as shown in FIG. 12, the rotor 13 is adapted for eccentric rotation about the supporting shaft 15 which in turn bears on the bearing surface 14 on the rotor 13. During the eccentric rotation of the rotor 13, its apexes move along the trochoidal orbit 16' on the sideboard 16 without leaving the orbit 16' at any moment.

The trochoidal orbit 16' followed by the apexes of the rotor 13 is very close to the trochoidal path 12 followed by the apexes 11 of the regular triangle 1 shown in FIG. 6 and provides a proper path of rotation for the rotor apexes. The internal surface of the casing is contoured to conform to the trochoidal orbit 16'.

Figure 13:
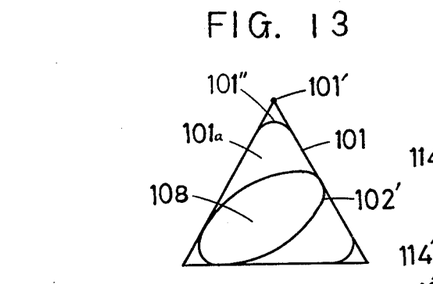
FIG. 13 illustrates the shape of a bearing surface on the rotor.

Description will now be made to the second embodiment of this invention with reference to FIGS. 13 through 16. Referring to FIG. 13, when an ellipse 108 representing the cross-section of a fixed bearing or supporting shaft on a sideboard is rotated within a regular triangle 101 defining the cross-section of a bearing surface on a rotor, the ellipse 108 is smoothly rotatable in contact with substantially the entire length of each side of the triangle 101, but does not contact the extremities of any side of the triangle 101 including its apexes 101', because of the arcuately shaped ends of the ellipse 108.

A triangle 101a having arcs 101" identical with the arcs 102' constituting the both ends of the ellipse 108 in place of the extremities of the sides of the regular triangle 101 including the apexes 101' with which the ellipse 108 makes no contact, is made. The triangle 101a will hereinafter be called a regular triangle, though it is not exactly so.

Figure 14:
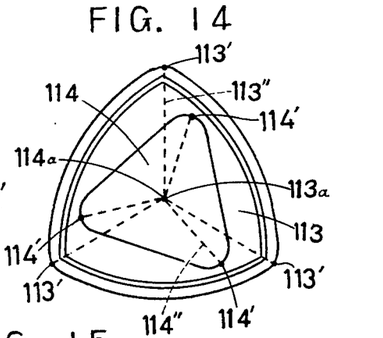
FIG. 14 is a side elevation of the rotor.

Referring to FIG. 14, the bearing having a desired depth and in the form of the regular triangle 101a shown in FIG. 13 is arranged in the center of one side of the rotor 113 as indicated at 114.

Three broken lines 113" connecting three apexes 113' of the side of the rotor 113 with its center 113a, and then three broken lines 114" connecting three apexes 114' of the bearing 114 with its center 114a are drawn successively. The latter center 114a coincides with the former center 113a. Each line 114" is inclined at a predetermined angle relative to one of the lines 113", so that the bearing 114 is inclined as much to the rotor 113.

Within the bearing 114 in the form of a regular triangle, which is shown in FIG. 14, an ellipse smoothly rotatable in close contact with all of the three sides of the triangle is made according to the principles illustrated in FIGS. 1-4. Then, the supporting shaft having an elliptical cross section identical with the ellipse 108 and a predetermined length is arranged in the center of one side of the sideboard 116 as indicated at 115 in FIG. 15.

Figure 15:
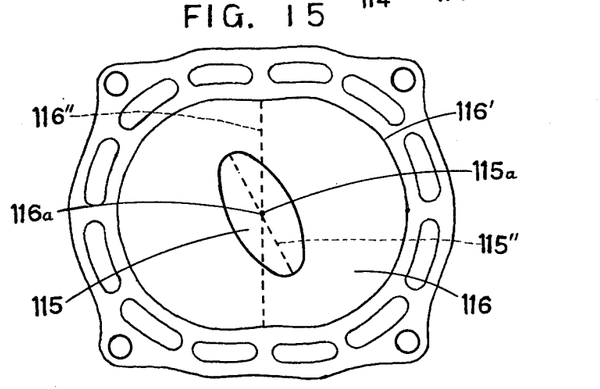
FIG. 15 is a side elevation of the sideboard on the combustion chamber side thereof and FIG. 16 is a side elevation of the rotor and the sideboard as assembled.

The minor line 116" (shown in a broken line) of a trochoidal orbit 116' on the sideboard 116 and the line of apsides 115" (shown in a broken line) intersect each other at their centers 115a and 116a as shown in FIG. 15. The central line 115" of the shaft 115 is inclined relative to the central line 116" of the sideboard 116 at an angle which is equal to that between each pair of lines 113" and 114".

Figure 16:
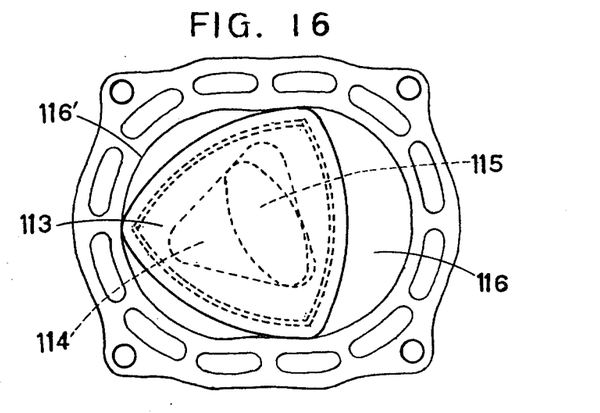

When the rotor 113 and the sideboard 116 are assembled as shown in FIG. 16, the rotor 113 rotates eccentrically about the shaft 115 supported on the bearing surface 114. When the rotor 113 of this second embodiment rotates, the apexes of the rotor 113 move in a trochoidal path 116' on the side of the sideboard 116 in the same way as described in connection with the first embodiment with reference to FIG. 12 without leaving the orbit 116' any any moment.

The trochoidal orbit 116' described by the apexes of the rotor 113 can serve as a proper orbit for rotation of the rotor apexes. The internal surface of the casing is formed to conform to the trochoidal orbit 116'.

As hereinabove set forth clearly, the elliptical cross-section of the fixed bearing or supporting shaft on the sideboard of a rotary engine constructed according to this invention presents a geometrically proper and perfect configuration which is rotatable within the regular triangular shape of the bearing surface on the rotor in proper contact therewith without leaving the bearing surface or being blocked in any corner of the triangle. Accordingly, there is virtually no clearance between the rotor and the fixed bearing therefor during the rotation of the rotor, so that no undesirable disorder may develop in the eccentric rotation of the rotor in the rotary engine constructed according to this invention. Therefore, no disorder may develop in the trochoidal curve which the rotor apexes follow during the rotation of the rotor.

Thus, this invention makes it possible to construct a rotary engine in which the clearance between the casing internal surface and the rotor apexes is very close to zero, so that virtually no leakage of harmful gas or wear or damage may occur between the casing internal surface and the rotor apexes. Therefore, the rotary engine constructed according to this invention has a drastically improved combustion efficiency which can be maintained over a long period of time without undergoing any appreciable reduction. Thus, this invention provides an extremely great contribution to the manufacture of rotary engines.

With particular reference to the embodiment shown in FIGS. 13 through 16, it will be understood that the obliquely disposed arrangement of the bearing surface on the rotor and the fixed bearing or supporting shaft on the sideboard will serve quite effectively to improve transformation of the energy produced by fuel combustion or explosion into torque.

It is further to be noted that according to this invention, the elliptical cross-sectional shape of the fixed bearing or supporting shaft on the sideboard is composed of correct arcs, while the regular triangle defining the cross-section of the bearing surface on the rotor is composed of straight lines. Therefore, any such elliptical and triangular configurations are advantageously easy to make accurately simply by compasses and rules to facilitate precise manufacture and fabrication of a rotary engine.

While the invention has been described with reference to the preferred embodiments thereof, it is to be understood that modifications or variations may be easily made by those skilled in the art without departing from the spirit and scope of this invention as defined by the appended claims.

What I claim is:

1. A method of making a rotary engine internal bearing surface for rotatably supporting a rotor having three apexes and internal bearing surfaces in the shape of a regular triangle, wherein the rotor rotates within a combustion chamber casing having an internal surface conforming to a two arch epitrochoidal line, according to the steps of:

(a) constructing three circles having a predetermined and equal radius centering around each of the respective apexes of the rotor regular triangle bearing surface;

(b) constructing three lines each internally parallel to a side of said triangle and tengential to the respective circles;

(c) constructing an arc of a circle centering around one of the three intersecting points of two of the three parallel lines, which arc is tangential to one of the parallel lines opposite the arc centering point;

(d) constructing two circles each having a radius equal to that of the radius of the three circles having predetermined radii, each of said two circles centering around one of the two intersecting points of said arc of a circle with an internally parallel line;

(e) connecting said two circles d) by an arc of a circle centering around the intersecting point of c) and tangentially contacting a side of said rotor regular triangle bearing surfaces;

(f) constructing an arc of a circle having a radius equal to that of said arc of a circle of e), symmetrically connecting said two circles of d); and (g) fabricating a bearing surface having a cross section following the continuous outside path defined by the circles of d) and the arc of e) and the arc of f).

2. The method of claim 1, further comprising the steps of modifying the angular extremities of said rotor regular triangle bearing surface to form said angular extremities into arcs of circles each having a radius no larger than the radius of the circles of (d).

3. The method of claim 1, further comprising the step of modifying the eccentricity value of the rotor by varying the radius of the circles of (a).

4. The method of claim 1, further comprising the step of symmetrically aligning said rotor internal bearing surfaces with said rotor apexes.

5. The method of claim 1, further comprising the step of non-symmetrically aligning said rotor internal bearing surfaces with said rotor apexes.

* * * * *

UNITED STATES PATENT AND TRADEMARK OFFICE
CERTIFICATE OF CORRECTION

PATENT NO. : 4,141,126
DATED : February 27, 1979
INVENTOR(S) : Fukumatsu Okada

It is certified that error appears in the above-identified patent and that said Letters Patent are hereby corrected as shown below:

Column 1, lines 26, Column 2, line 5:
    correct --trochiodal-- to read --trochoidal--.
Column 1, line 37: "trochiodally" should read --trochoidally--.
Column 1, line 37:
    correct --roation-- to read --rotation--.

Column 1, line 53:
    change --in-- to --by--.

Column 2, line 5:
    change --thr-- to --the--.

Column 2, line 67:
    change --ration-- to --ratio--.

Column 3, line 40:
    delete --de--.

Column 7, line 16:
    correct --tengential-- to read --tangential--.

Signed and Sealed this

Ninth Day of October 1979

[SEAL]

Attest:

RUTH C. MASON
Attesting Officer

LUTRELLE F. PARKER
Acting Commissioner of Patents and Trademarks